United States Patent
Sishtla et al.

(10) Patent No.: US 12,306,331 B2
(45) Date of Patent: May 20, 2025

(54) VERTICAL SITUATION DISPLAY USING CELL-BASED ARCHITECTURE

(71) Applicant: Rockwell Collins, Inc., Cedar Rapids, IA (US)

(72) Inventors: Venkata A. Sishtla, Cedar Rapids, IA (US); Divesh Lakhi, Cedar Rapids, IA (US); Mark Fersdahl, Cedar Rapids, IA (US); Jeffery A. Finley, Cedar Rapids, IA (US)

(73) Assignee: Rockwell Collins, Inc., Cedar Rapids, IA (US)

(*) Notice: Subject to any disclaimer, the term of this patent is extended or adjusted under 35 U.S.C. 154(b) by 354 days.

(21) Appl. No.: 17/872,401

(22) Filed: Jul. 25, 2022

(65) Prior Publication Data

US 2024/0027575 A1    Jan. 25, 2024

(51) Int. Cl.
    *G01S 7/20*      (2006.01)
    *G01S 7/41*      (2006.01)
    *G01S 13/95*     (2006.01)

(52) U.S. Cl.
    CPC .............. *G01S 7/20* (2013.01); *G01S 7/412* (2013.01); *G01S 7/417* (2013.01); *G01S 13/953* (2013.01)

(58) Field of Classification Search
    CPC . G01S 7/20; G01S 7/412; G01S 7/417; G01S 13/953
    See application file for complete search history.

(56) References Cited

U.S. PATENT DOCUMENTS

| | | |
|---|---|---|
| 4,940,987 A | 7/1990 | Frederick |
| 5,198,819 A | 3/1993 | Susnjara |
| 5,398,033 A | 3/1995 | Michie |
| 9,134,418 B1 | 9/2015 | Kronfeld et al. |
| 9,244,167 B1 * | 1/2016 | Oransky ................. G01S 13/87 |
| 9,411,044 B1 * | 8/2016 | Sperling ............... G01S 13/953 |
| 9,535,158 B1 * | 1/2017 | Breiholz .................. G01S 7/04 |
| 9,869,766 B1 * | 1/2018 | Breiholz ............... G01S 13/106 |
| 10,605,912 B1 | 3/2020 | Godfrey et al. |
| 11,187,800 B1 | 11/2021 | Fersdahl et al. |
| 2021/0103051 A1 * | 4/2021 | Tang ...................... G01S 13/95 |

FOREIGN PATENT DOCUMENTS

| | | |
|---|---|---|
| CN | 106019286 B | 6/2018 |
| RU | 2672040 C2 | 11/2018 |

OTHER PUBLICATIONS

Extended European Search Report dated Nov. 17, 2023; European Application No. 23187662.4.

\* cited by examiner

*Primary Examiner* — Whitney Moore
(74) *Attorney, Agent, or Firm* — Suiter Swantz IP (57) ABSTRACT

A radar system performs a plurality of horizontal scans; from the horizontal scans, the radar system identifies several cells. Based on the horizontal scans, the radar system produces a first vertical profile that is applied to the identified cells. The radar system performs one or more vertical scans of one of the identified cells to get measured reflectivity values in elevation. The measured reflectivity values are used to create a second vertical profile. The second vertical profile is used to refine the first vertical profile at the location of the identified cell and also to proximal weather. The data used to create the first and second vertical profiles can be combined into a data packet and stored within the radar or transmitted to a remote device. The remote device can reproduce a third vertical profile from the information in the data packet at any point.

17 Claims, 6 Drawing Sheets

VERTICAL SITUATION DISPLAY USING CELL-BASED ARCHITECTURE

BACKGROUND

It is difficult to create both horizontal and vertical weather scans for any location in front of an aircraft due to the need to utilize the antenna. Currently, the way to produce a VSD is to restrict the display along one azimuth that the pilot chooses or along the aircraft track. A radar system may conduct many horizontal scans to acquire data points horizontally that can add up to produce a vertical image, or actually conduct a vertical scan along a specific heading.

It would be advantageous to have a system and method to produce both the horizontal and vertical displays at any location while maintaining efficient antenna utilization.

SUMMARY

In one aspect, a radar system performs a plurality of horizontal scans; from the horizontal scans, the radar identifies several cells. Based on the horizontal scans, the radar system creates and produces estimate of a vertical reflectivity profile at any point within the radar field of view. Likewise, the radar system can use stored data from previous radar scans for any point behind the aircraft.

In a further aspect, the radar system performs one or more vertical scans of the identified cells and produces a measured second estimate of the vertical reflectivity profile with altitude. The vertical profile may include, but is not limited to, base reflectivity, reflectivity falloff with altitude, and cell height.

In further aspect, the parameters derived from the second reflectivity profile are used to refine the first vertical profile estimate to create a third vertical profile estimate not only of the cell being scanned vertically but also areas of reflectivity in the vicinity. In addition, the data required to create the third vertical profile at any point within the radar field of view or behind the aircraft can be transmitted to a remote device where vertical profiles can be computed for any point within the radar field of view or behind the aircraft. It is to be understood that both the foregoing general description and the following detailed description are exemplary and explanatory only and should not restrict the scope of the claims. The accompanying drawings, which are incorporated in and constitute a part of the specification, illustrate exemplary embodiments of the inventive concepts disclosed herein and together with the general description, serve to explain the principles.

BRIEF DESCRIPTION OF THE DRAWINGS

The numerous advantages of the embodiments of the inventive concepts disclosed herein may be better understood by those skilled in the art by reference to the accompanying figures in which.

DETAILED DESCRIPTION

Before explaining various embodiments of the inventive concepts disclosed herein in detail, it is to be understood that the inventive concepts are not limited in their application to the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of a feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Also, while various components may be depicted as being connected directly, direct connection is not a requirement. Components may be in data communication with intervening components that are not illustrated or described.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in at least one embodiment" in the specification does not necessarily refer to the same embodiment. Embodiments of the inventive concepts disclosed may include one or more of the features expressly described or inherently present herein, or any combination or sub-combination of two or more such features.

Broadly, embodiments of the inventive concepts disclosed herein are directed to a radar system that performs a plurality of horizontal scans; from the horizontal scans, the radar system identifies several cells. Based on the horizontal scans, the radar system produces a first vertical profile that is applied to the identified cells. The radar system performs one or more vertical scans of one of the identified cells to get measured reflectivity values in elevation. The measured reflectivity values are used to create a second vertical profile. The second vertical profile is used to refine the first vertical profile at the location of the identified cell and also to proximal weather (e.g., within ten nautical miles). The data used to create the first and second vertical profiles can be combined into a data packet and stored within the radar or transmitted to a remote device. The remote device can reproduce a third vertical profile from the information in the data packet at any point.

Figure 1:
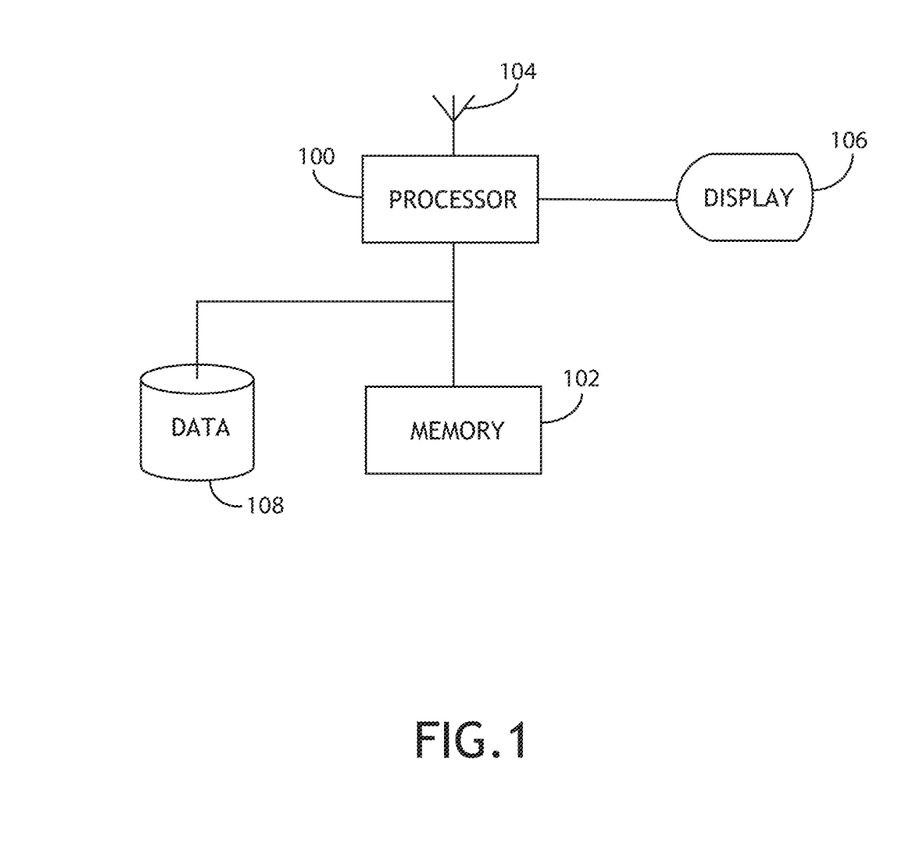
FIG. 1 shows a block diagram of a system according to an exemplary embodiment.

Referring to FIG. 1, a block diagram of a system according to an exemplary embodiment is shown. The system includes a processor 100, memory 102 connected to the processor 100 for storing processor executable code, and a radar antenna 104 connected to the processor 100. The processor 100 is configured to perform a plurality of horizontal scans via the radar antenna 104. From the plurality of horizontal scans, the processor 100 calculates a hi-resolution reflectivity image and identifies individual thunderstorm areas ("cells"). The processor 100 uses the hi-resolution reflectivity and the storm top attributes from the nearest cell to derive a vertical profile for the cell. In at least one embodiment, the vertical profile defines a substantially continuous function of reflectivity values related to altitude. The vertical profile is obtained from the reflectivity image and a pre-determined average fall off rate of reflectivity with respect to altitude.

In at least one embodiment, a set of predetermined vertical profiles may be stored in the data storage element 108 and the processor may determine a vertical profile with reference to the predetermined vertical profiles by finding a "best fit" profile. Alternatively, or in addition, the processor 100 may define a neural network trained to produce a vertical profile based on a training set of data including horizontal scan data points and known cell reflectivity as a function of altitude. The processor 100 may build this vertical profile for all locations in front of the aircraft or for specific locations that are based on a user input, along aircraft track, or along a flight plan. Likewise, the processor 100 may store horizontal scan data to build vertical profiles for any location behind the aircraft.

In at least one embodiment, the processor 100 performs a vertical scan on the maximum intensity location (also referred to as highest reflectivity location) of one or more cells, and the vertical scan information is stored in a data storage element 108. In addition to the vertical scan information, each cell may define several attributes including: areas for all the reflectivity values measured (20, 30, 40, and 50 dBz); location of the highest reflectivity location; threat information such as a probability of lightning and hail; etc. The processor 100 may apply a relative position referenced to each datum and store it in the data storage element 108. In at least one embodiment, periodic vertical scans of cells may verify or update the vertical profile. In addition, the processor 100 may add or subtract data points and recompute the vertical profile.

In at least one embodiment, the processor 100 can apply the determined vertical profile to any proximal cell; even cells for which no vertical scans were taken. For example, where there are a number of cells in the field of view. The processor 100 performs a vertical scan on one of the cells, calculates a vertical profile, then apply the vertical profile a second cell. The system may extrapolate or interpolate a vertical profile of the second cell based on the known profile of the first cell.

The processor 100 produces a high-resolution vertical profile of the weather at any range/azimuth location from horizontal and vertical scan. The horizontal data provides high resolution data in the range/azimuth coordinate frame but very sparse data in the elevation direction. The vertical scan data provides high resolution data in the range/elevation coordinate frame but very sparse data in the azimuth direction. The processor 100 combines the benefits of both products to produce the detailed vertical profile product at any range/azimuth/elevation combination.

In at least one embodiment, the processor 100 may receive hi-resolution reflectivity and storm top data from external sources such as ground based radar, satellites, etc., and build a vertical profile without first hand radar data. The processor 100 may reside within the radar system or outside; for example, an aircraft interface device (AID), electronic flight bag (EFB), etc.

Figure 2:
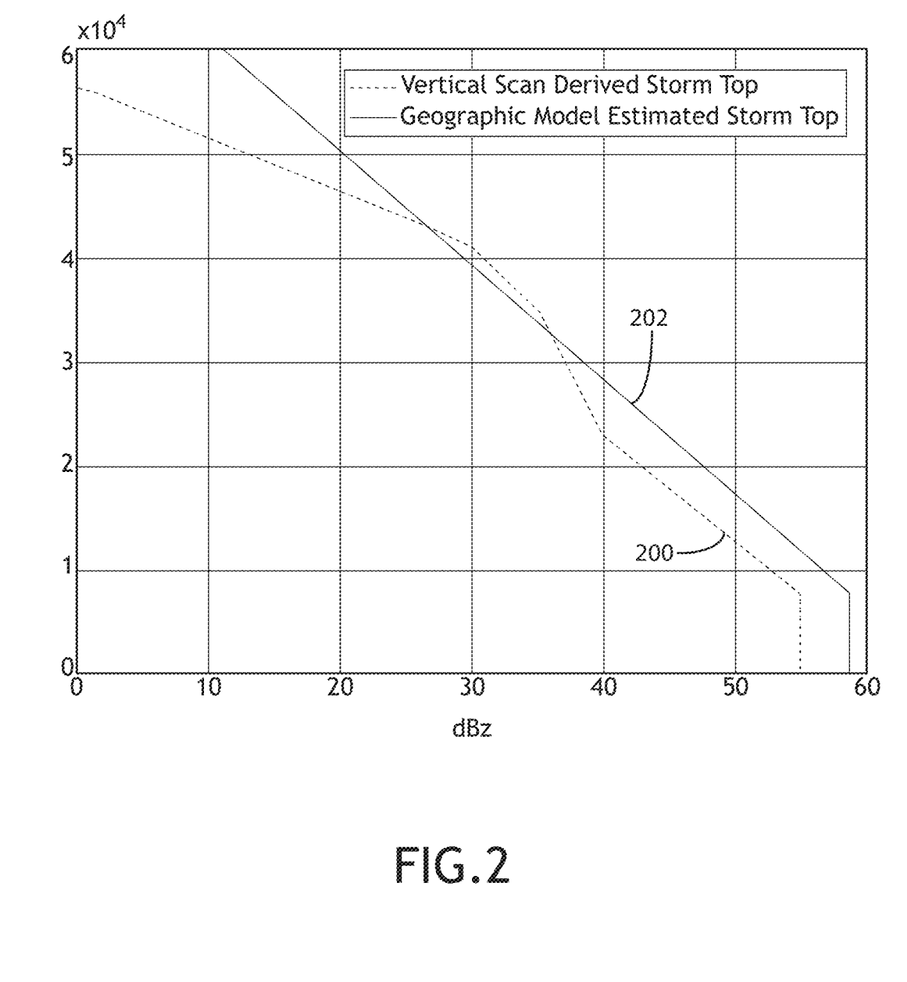
FIG. 2 shows a graphical output according to an exemplary embodiment.

Referring to FIG. 2, a graphical output according to an exemplary embodiment is shown. A radar system may perform a number of horizontal scans and potentially one or more vertical scans of a cell. Based on the scans, the radar system may derive a vertical profile 200 for the cell. The vertical profile shows a specific rate change in radar reflectivity as a function of altitude: at 20,000 feet reflectivity will typically be a first value, and at 25,000 feet it will be some lesser value, and still less at 30,000 feet. There are typical rates of reflectivity fall-off, but they are not consistent. The radar system may apply specifically measured rates of fall-off to cells around the measured cell and assume that the fall-off rate is the same.

A high-resolution base reflectivity map of the environment in front of the aircraft is computed using the data from the horizontal scans. Based on the derived vertical profile 200, the radar system may calculate a vertical profile 202 for neighboring cells for which no vertical scan data is known. The calculated vertical profile 202 may be based on an interpolation function calculated from the derived vertical profile 200 and then applied to known features of the neighboring cell.

In at least one embodiment, the radar also produces the derived vertical profile 200 for the highest reflectivity location using data from the vertical scan. This derived vertical profile 200 may be used for every location in the surrounding area, applying the derived vertical profile 200 to those locations as well.

In at least one embodiment, the radar system may receive a reference vertical profile from one or more external sources. A statistically derived (mean, median, etc.) vertical profile for all the other cells in view may also be used as a reference. A radar system may generate vertical scans very accurately with a minimum amount of data. The system doesn't need very much horizontal data, and vertical data only on some spots in order to generate vertical profiles 200, 202.

Figure 3:
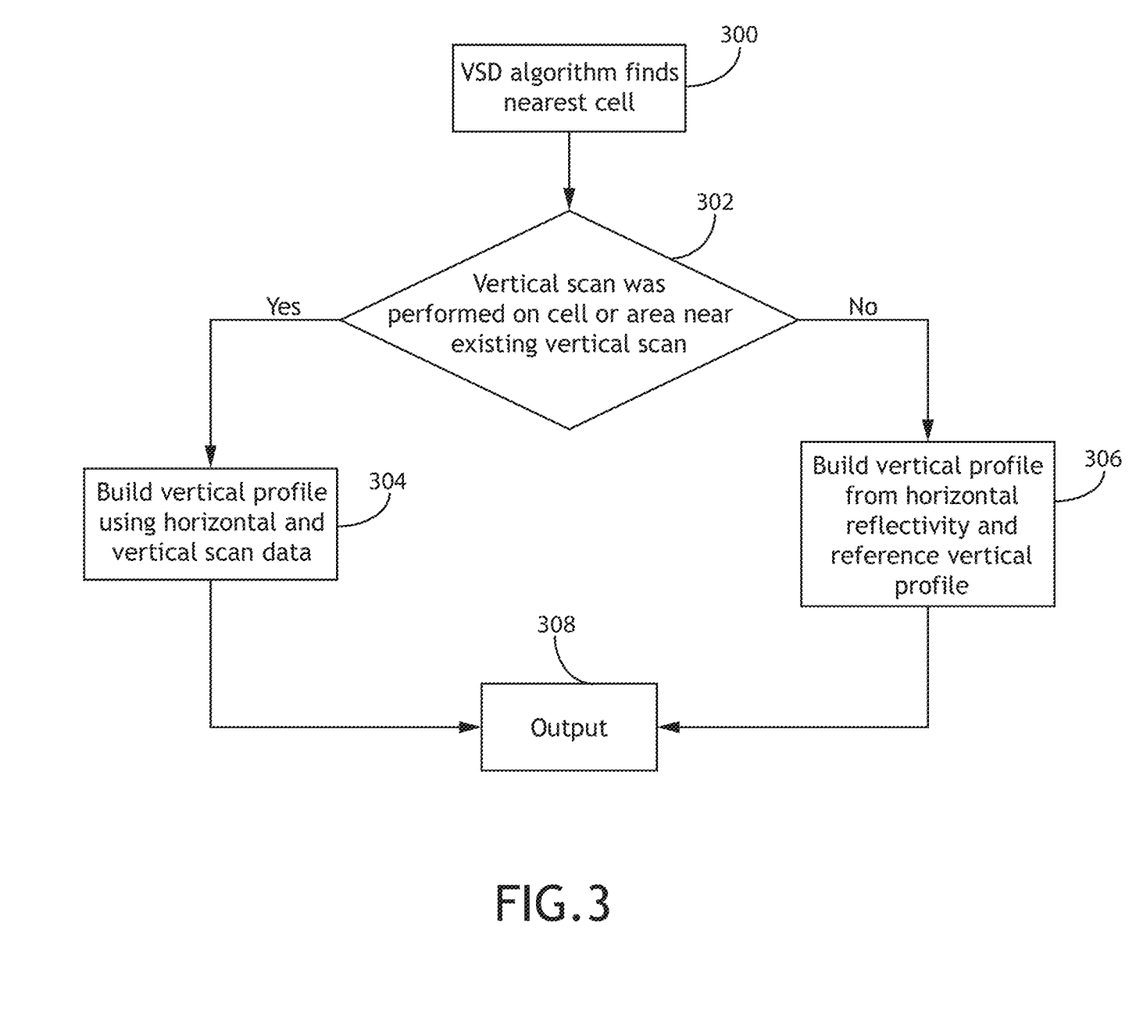
FIG. 3 shows a flowchart of a method according to an exemplary embodiment.

Referring to FIG. 3, a flowchart of a method according to an exemplary embodiment is shown. A radar system receives horizontal scan data sufficient to identify 300 a plurality of nearby cells. If any vertical scans were performed 302 for one of the cells, the radar system may build 304 a vertical profile using the horizontal scan and vertical scan data, and output 308 the vertical profile for the radar system to use in conjunction with other cells for which the radar system does not have any vertical scan data. Furthermore, the radar system may output 308 a data packet including the vertical profile and a sparse point cloud of horizontal scan and vertical scan data. The vertical profile and a sparse point cloud may be used to reconstruct a rendering of a weather system by a remote system.

Alternatively, if no vertical scans were performed 302, the radar system may build 306 a vertical profile from horizontal scan data and a reference vertical profile. The reference vertical profile may comprise a vertical profile build 304 from cells where vertical scan data exists. Alternatively, or in addition, the radar system may receive a remotely computed vertical profile, or reference a stored set of precomputed vertical profiles.

Figure 4:
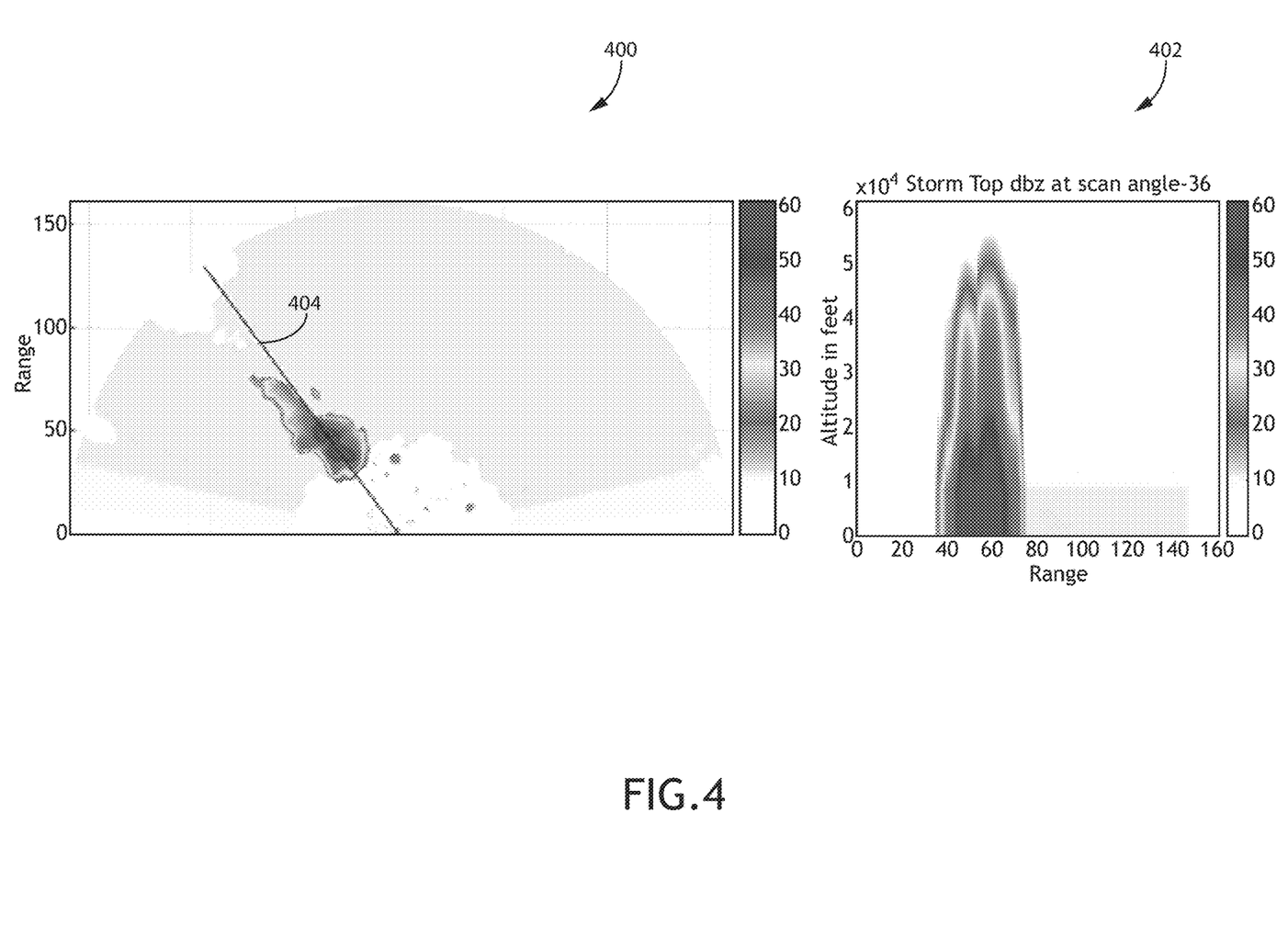
FIG. 4 shows radar images of storm events.

Referring to FIG. 4, radar images of storm events is shown. A radar system may utilize embodiments disclosed herein to render a VSD 402 along a user selected azimuth 404 or flight path. The VSD 402 shows, how tall the target is for a given range.

Figure 5:
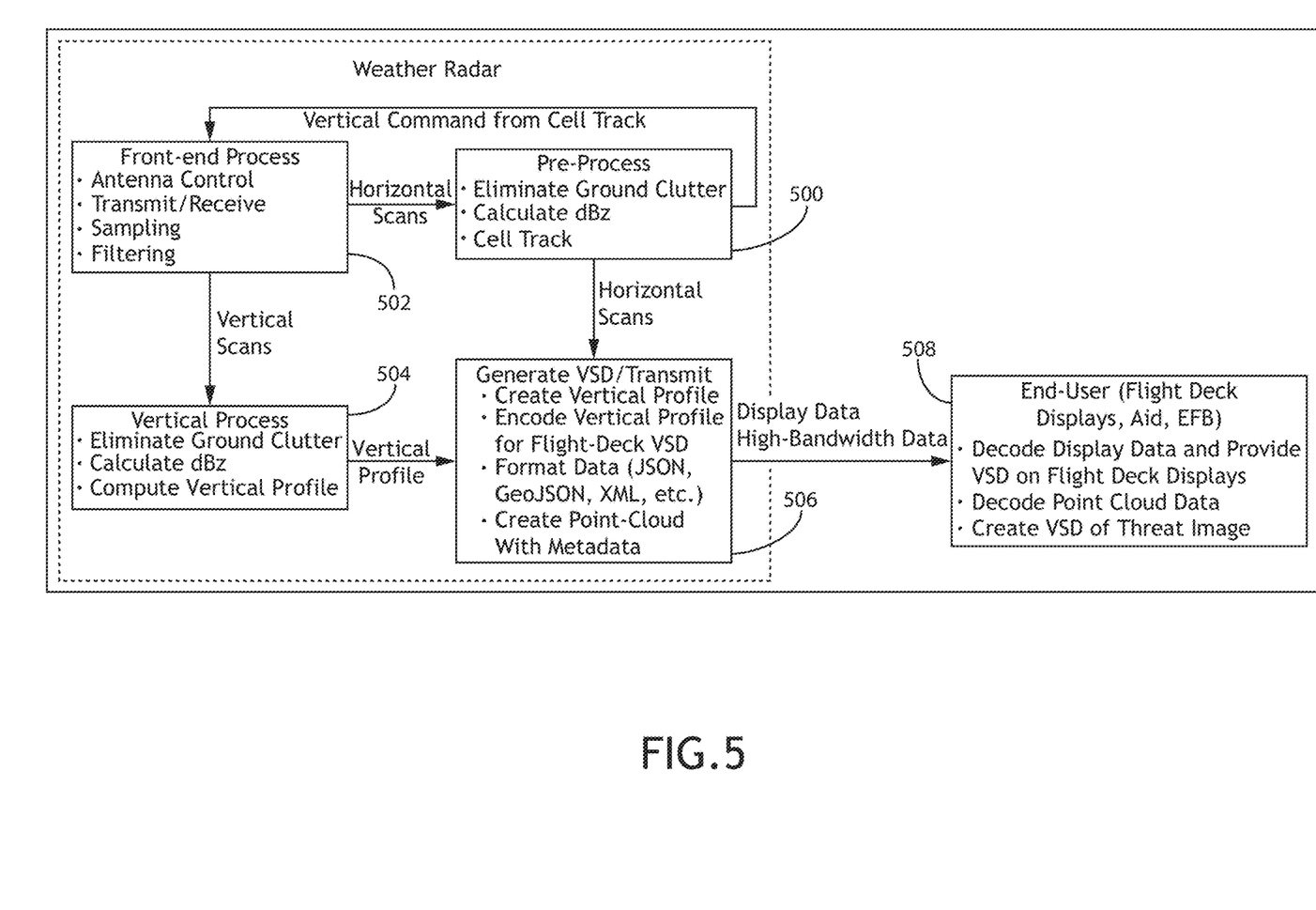
FIG. 5 shows a flowchart of a method according to an exemplary embodiment.

Referring to FIG. 5, a flowchart of a method according to an exemplary embodiment is shown. Where a system according to at least one embodiment resides within a local radar system, the radar system may perform 500 a plurality of horizontal scans and sample/filter the resulting horizontal scan data. The radar system also performs 500 pre-processing on the horizontal scan data to illuminate ground clutter and identify a number of cells.

The radar system also performs 504 a vertical scan of at least one of the cells, also eliminating ground clutter, and identifying vertical attributes. Based on the horizontal scans and the vertical attributes, the radar system generates 506 a vertical profile that may be applied to cells without any vertical scan data. The generated vertical profile is useful for local areas of interest, user selected, along aircraft track, or along flight plan. In at least one embodiment, the radar system may encode the data into an appropriate display format and send 508 the formatted data to a flight deck displays.

Alternatively, or in addition, the vertical profile information in the form of storm tops, along with other radar information such as hi-resolution reflectivity, turbulence, cell track data, etc., may be transmitted to an external user as a point cloud with metadata in a specific format; for example, JSON, GeoJSON, XML, etc. An external user such as an aircraft interface device (AID) or an EFB can build 2D or 3D polygons based on the point cloud information and display it as a VSD or create a general threat image which can be used for autonomous operation.

Figure 6:
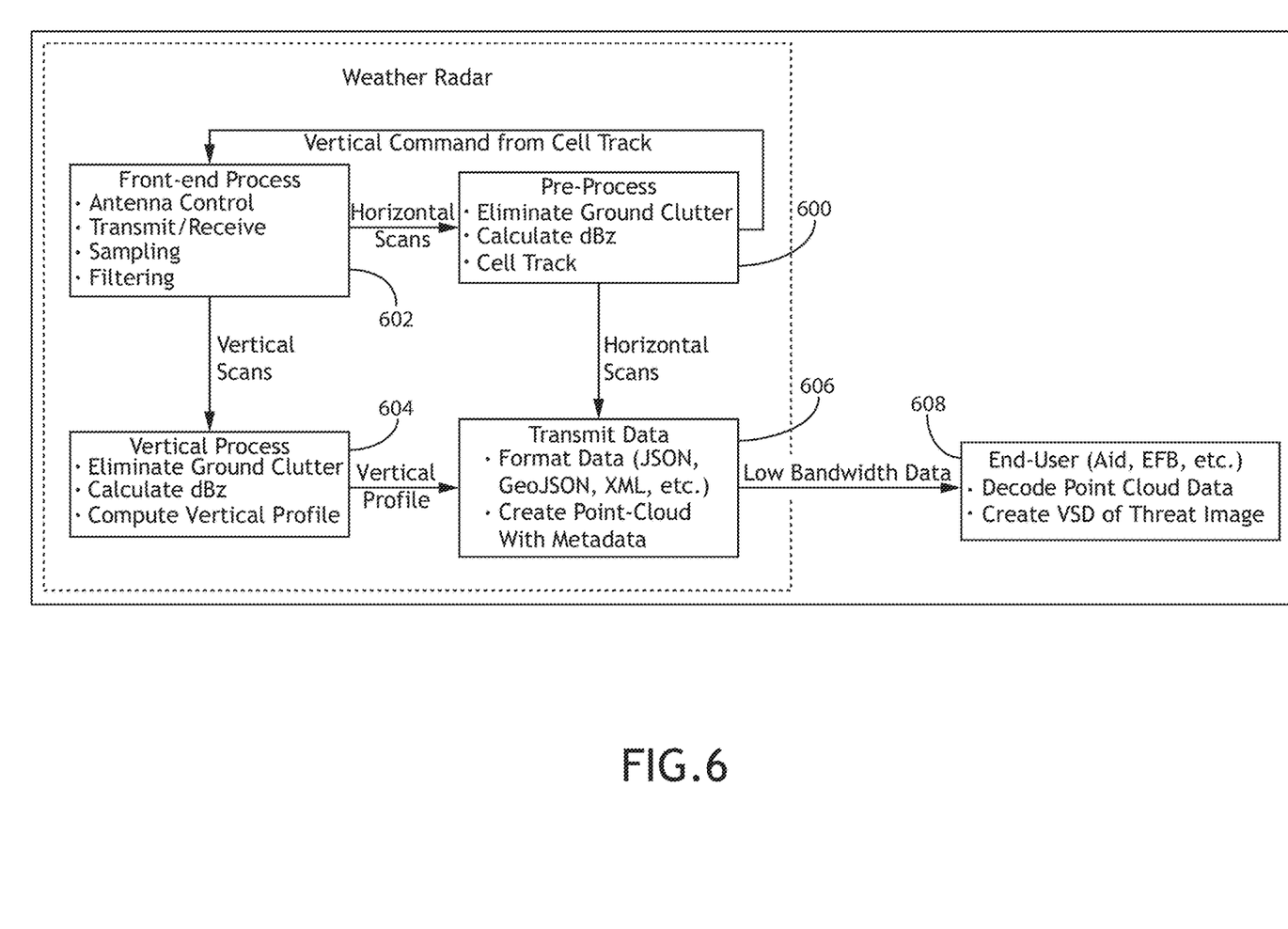
FIG. 6 shows a flowchart of a method according to an exemplary embodiment.

Referring to FIG. 6, a flowchart of a method according to an exemplary embodiment is shown. Where a system according to at least one embodiment is external to the local radar system, a remote radar system performs 600 the plurality of horizontal scans and sample/filter the resulting horizontal scan data, and also performs 604 a vertical scan of at least one of the cells to generate 606 the vertical profile. The generated vertical profile is encoded into a sparse point cloud.

The local radar system receives the encoded sparse point cloud and horizontal scan data and renders 608 the data locally, potentially as a corresponding set of polygons. The encoded data may include hi-resolution or low-resolution reflectivity, cell specific information including storm tops, turbulence, etc., and a 2D point cloud or 3D point cloud. Furthermore, the encoded data may be encoded in a specific format; for example, JSON, GeoJSON, XML, etc. The local radar system may include an AID or EFB to compute the vertical profile and provide a variety of displays including VSD, a storm height plan position indicator (PPI), alpha numeric storm top display, or a general threat image which can be used for autonomous operation. The remote radar system may determine a level of granularity to distribute the encoded data.

The amount of encoded data needed to generate any vertical profile within the local radar system's field of view is much smaller than sending a complete 3D point cloud with all of the corresponding information out to 320 miles, plus or minus 180 or plus or minus 90 degrees.

Embodiments of the present disclosure derive the vertical profile from some set of known data, but not necessarily as it applies to the cell being scanned. The data to produce a rendering including the vertical profile may be packaged to allow for a small amount of data to be used to interpolate vertical profile data being shared. A small data payload enables robust VSD functionality on an EFB, even as an auxiliary display device for aircraft that do not have a dedicated flight deck display to show the vertical profile of a storm.

Embodiments of the present disclosure enable the creation of vertical profiles at any point within the radar field of view or behind the aircraft with far less data than is required by other contemporary methods. The amount of data being transmitted allows a separate remote device to independently produce the vertical profiles.

It is believed that the inventive concepts disclosed herein and many of their attendant advantages will be understood by the foregoing description of embodiments of the inventive concepts, and it will be apparent that various changes may be made in the form, construction, and arrangement of the components thereof without departing from the broad scope of the inventive concepts disclosed herein or without sacrificing all of their material advantages; and individual features from various embodiments may be combined to arrive at other embodiments. The forms herein before described being merely explanatory embodiments thereof, it is the intention of the following claims to encompass and include such changes. Furthermore, any of the features disclosed in relation to any of the individual embodiments may be incorporated into any other embodiment.

What is claimed is:
1. A computer apparatus comprising:
a radar antenna;
a display; and
at least one processor in data communication with the radar antenna, the display, and a memory storing processor executable code for configuring the at least one processor to:
perform a plurality of horizontal radar scans via the radar antenna;
identify at least two cells in a field of view;
determine a vertical profile at a maximum reflectivity value within a first cell in the at least two cells based on the plurality of horizontal radar scans;
apply the vertical profile to weather proximal to the maximum reflectivity value in a second cell in the at least two cells;
render representation of the second cell including the vertical profile on the display;
encode a data packet including horizontal weather information derived from the plurality of horizontal radar scans and the vertical profile, the data packet comprising a point cloud, reflectivity, storm tops, and turbulence;
determine a granularity of the data packet to distribute; and
transmit the data packet to a remote platform.

2. The computer apparatus of claim 1, wherein:
the at least one processor is further configured to perform at least one vertical scan of the first cell; and
determining the vertical profile is also based on the at least one vertical scan.

3. The computer apparatus of claim 1, wherein the at least one processor is further configured to:
perform a plurality of horizontal scans from the remote platform;
identify cells via the plurality of horizontal scans from the remote platform; and
apply the vertical profile to the identified cells.

4. The computer apparatus of claim 1, wherein the at least one processor is further configured to:
store horizontal scan data from the plurality of horizontal radar scans; and
determine a vertical profile at a location behind an aircraft based on the stored horizontal scan data.

5. The computer apparatus of claim 1, wherein determining the vertical profile comprises comparing reflectivity data from the plurality of horizontal scans to a set of known vertical profiles to identify a best-fit vertical profile.

6. The computer apparatus of claim 1, wherein determining the vertical profile comprises processing the plurality of horizontal radar scans via a neural network trained on a data set of horizontal radar scans and corresponding vertical radar scans.

7. A method comprising:
performing a plurality of horizontal radar scans;
identifying at least two cells in a field of view;
determining a vertical profile at a maximum reflectivity value within a first cell in the at least two cells based on the plurality of horizontal radar scans;
applying the vertical profile to weather proximal to the maximum reflectivity value in a second cell in the at least two cells;
rendering representation of the second cell including the vertical profile;
encoding a data packet including horizontal weather information derived from the plurality of horizontal radar scans and the vertical profile, the data packet comprising a point cloud, reflectivity, storm tops, and turbulence;
determining a granularity of the data packet to distribute; and
transmitting the data packet to a remote platform.

8. The method of claim 7, further comprising performing at least one vertical scan of the first cell, wherein determining the vertical profile is also based on the at least one vertical scan.

9. The method of claim 7, further comprising:
performing a plurality of horizontal scans from the remote platform;
identifying cells via the plurality of horizontal scans from the remote platform; and
applying the vertical profile to the identified cells.

10. The method of claim 7, further comprising:
storing horizontal scan data from the plurality of horizontal radar scans; and
determining a vertical profile at a location behind an aircraft based on the stored horizontal scan data.

11. The method of claim 7, wherein determining the vertical profile comprises comparing reflectivity data from the plurality of horizontal scans to a set of known vertical profiles to identify a best-fit vertical profile.

12. The method of claim 7, wherein determining the vertical profile comprises processing the plurality of horizontal radar scans via a neural network trained on a data set of horizontal radar scans and corresponding vertical radar scans.

13. A radar system comprising:
a radar antenna;
at least one processor in data communication with a memory storing processor executable code for configuring the at least one processor to:
perform a plurality of horizontal radar scans via the radar antenna;
identify at least two cells in a field of view;
determine a vertical profile at a maximum reflectivity value within a first cell in the at least two cells based on the plurality of horizontal radar scans;
apply the vertical profile to a second cell in the at least two cells;
render representation of the second cell including the vertical profile on a display;
encode a data packet including horizontal weather information derived from the plurality of horizontal radar scans and the vertical profile, the data packet comprising a point cloud, reflectivity, storm tops, and turbulence;
determine a granularity of the data packet to distribute; and
transmit the data packet to a remote platform.

14. The radar system of claim 13, wherein:
the at least one processor is further configured to perform at least one vertical scan of the first cell; and
determining the vertical profile is also based on the at least one vertical scan.

15. The radar system of claim 13, wherein the at least one processor is further configured to:
perform a plurality of horizontal scans from the remote platform;
identify cells via the plurality of horizontal scans from the remote platform; and
apply the vertical profile to the identified cells.

16. The radar system of claim 13, wherein the at least one processor is further configured to:
store horizontal scan data from the plurality of horizontal radar scans; and
determine a vertical profile at a location behind an aircraft based on the stored horizontal scan data.

17. The radar system of claim 13, wherein determining the vertical profile comprises comparing reflectivity data from the plurality of horizontal scans to a set of known vertical profiles to identify a best-fit vertical profile.

* * * * *